July 7, 1931.  R. T. HOSKING  1,813,053

SELF LOCKING FILLISTER HEAD SET SCREW

Filed Nov. 22, 1929

INVENTOR
Richard T. Hosking
BY
ATTORNEY

Patented July 7, 1931

1,813,053

UNITED STATES PATENT OFFICE

RICHARD T. HOSKING, OF WILMETTE, ILLINOIS, ASSIGNOR, BY MESNE ASSIGNMENTS, TO SHAKEPROOF LOCK WASHER COMPANY, OF CHICAGO, ILLINOIS, A CORPORATION OF DELAWARE

SELF-LOCKING FILLISTER HEADSET SCREW

Application filed November 22, 1929. Serial No. 409,149.

This invention relates to self-locking set screws and particularly to that type of screw which has a threaded shank and a cylindrical shaped non-threaded head adapted to be received in the recess in the work, so the top of the head will be flush with or below the surface of the work.

The object of the invention is to provide the screw head with means for automatically locking it against unscrewing, the locking means operating by a direct and progressively increasing biting-in action of longitudinal spring teeth formed in the screw head, and is made long enough to provide the requisite length for the spring action of the tongues and positioned to gouge or bite into the wall of the hole in the work when there is a tendency for the bolt to unscrew.

With the foregoing and certain other objects in view, which will appear later in the specification, the invention comprises the devices described and claimed and the equivalents thereof.

In the drawings Fig. 1 is a top plan view of a screw head embodying my improvement.

Figure 1:
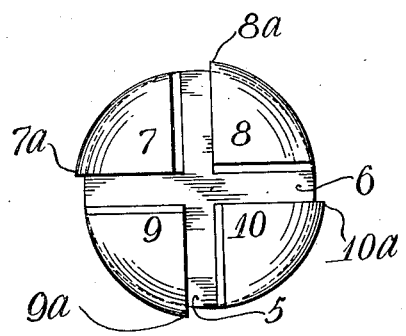

As is clearly shown in the drawings, a threaded bolt 1 having a head 2 of spring material shaped to be received in a complemental hole 3 in a piece of work 4 constitutes the type of bolt to which my improvement is adapted to be applied.

The head 2 is formed with slots, preferably two in number, 5, 6, arranged in intersecting planes and extending from the top of the head 2 toward its base.

These intersecting slots 5, 6 define a number of spring tongues, 7, 8, 9, 10, preferably, but not necessarily sector-shaped in cross section.

Figure 3:
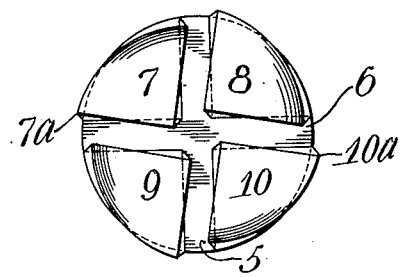
Figs. 3 and 4 are respectively a top plan view and side view of a modified form of the device.
Figure 2:
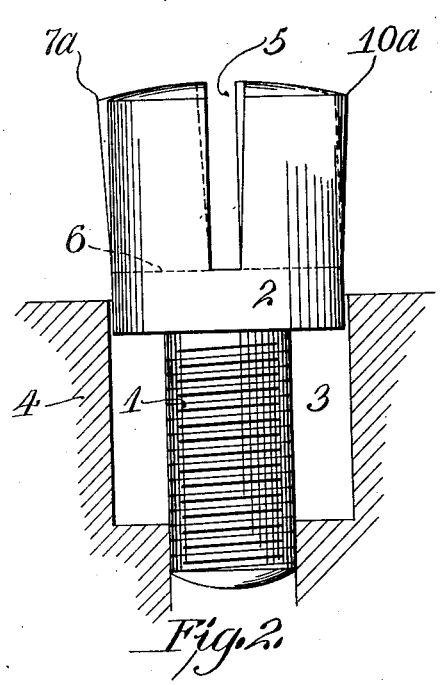
Fig. 2 is a side view showing the screw in relation to the work before being driven to its seat.
Figure 4:
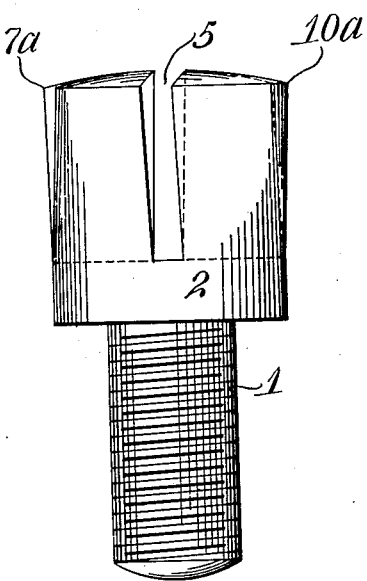

The free end 7 of at least one of said tongues, and preferably all of them, is bent either in the direction of the plane of a slot, as shown in Figs. 1 and 2, or bent somewhat spirally to twist the tongue, as shown in Figs. 3 and 4. Whichever way the tongue is bent it presents one of its longitudinal edges, as a tooth 7a, 8a, 9a, 10a that projects beyond the normal cylindrical periphery of the head. The tooth is so positioned and presented to the wall of the work that it is in biting-in relation to the wall of the hole 3, so that any tendency to turn the screw in the reverse direction results in the tooth embedding itself in the wall of the hole 3, thereby firmly locking the bolt 1 against unscrewing.

By the means above described I have produced a simple, strong and effective self-locking head for a cap screw wherein a multiplicity of biting teeth can be presented to the work to insure effectiveness of the locking action.

Having thus described my invention, what I claim and desire to secure by Letters Patent is:

1. A fillister bolt having its cylindrical head elongated and made of spring material shaped to be received in a complemental hole in a piece of work and formed with two slots in intersecting planes extending from the top of the head toward its base, said slots defining between them a plurality of spring tongues each integral at one end with the base of said head and bent in a way to present one of its longitudinal edges as a spring tooth projecting farthest beyond the cylindrical periphery of the head at the top thereof and least at the base thereof, said tooth positioned in progressively increased biting-in relation to the wall of said hole from the base to the top for locking the bolt against tendency to unscrew.

2. In combination with a bolt having a threaded shank and a cylindrical non-threaded head to be seated in a work-receiving recess, said head being of larger diameter than the shank, a plurality of resilient tongue members integral and projecting axially from the upper part of the solid portion of said head, said tongue members made of spring material and each shaped in a way to present one of its longitudinal edges as a biting spring tooth that projects farther beyond the cylindrical periphery of the head at the ends of the tongues than at the junction of the head and the tongues and engages with the walls of said recess.

In testimony whereof, I affix my signature.

RICHARD T. HOSKING.